March 2, 1937.                         J. BAILEY                          2,072,807
           MEANS FOR AND METHOD OF CONTROLLING FLOW OF GLASS TO A FEEDER OUTLET
                                  Filed June 15, 1934
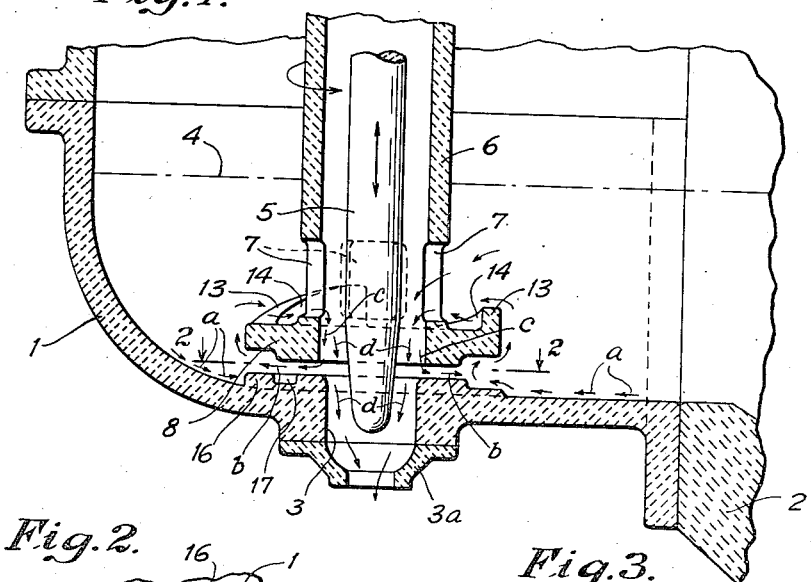
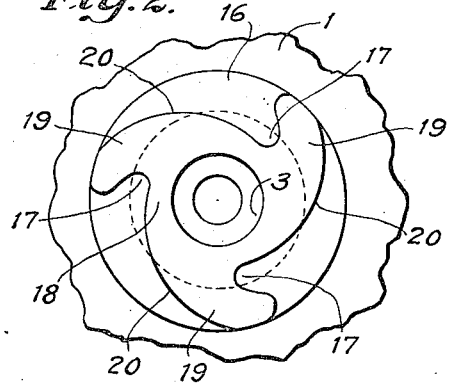
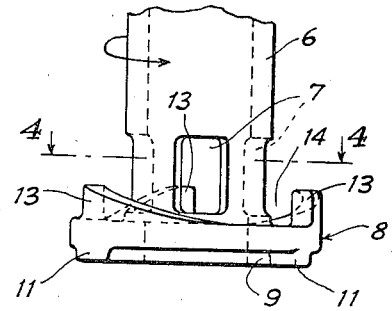
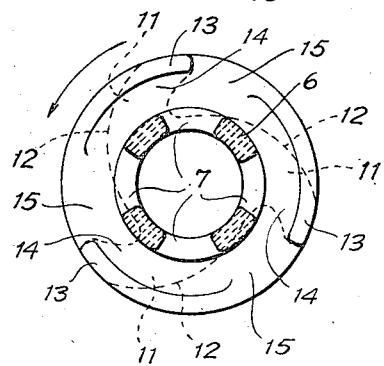
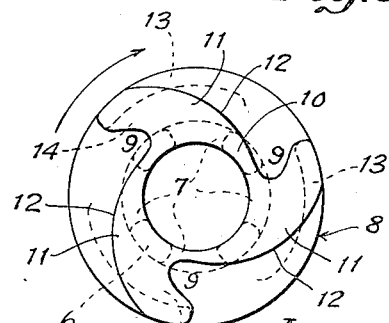
Witness:
A. A. Horn
Inventor:
James Bailey
by Brown & Parham
Attorneys.

Patented Mar. 2, 1937

2,072,807

UNITED STATES PATENT OFFICE 2,072,807

MEANS FOR AND METHOD OF CONTROLLING FLOW OF GLASS TO A FEEDER OUTLET

James Bailey, Hamburg, N. Y., assignor to Hartford-Empire Company, Hartford, Conn., a corporation of Delaware Application June 15, 1934, Serial No. 730,749

13 Claims. (Cl. 49—55)

It is usual in feeding molten glass in mold charges to maintain a supply body of molten glass in a feeding container in position to submerge a discharge outlet from which glass of the supply body tends to issue. Such a feeding container may comprise the outer end portion of a forehearth or furnace extension to which glass may flow from a melting tank furnace or like source of supply of molten glass.

The glass contacting walls of such a forehearth or furnace extension are customarily made of a refractory material. Glass in contact with the refractory walls of such a forehearth or furnace extension tends to become chilled and be otherwise contaminated by reason of such contact. This contaminated glass moves more sluggishly, and is heavier than the uncontaminated and hotter glass. Portions of the refractory-contaminated glass, on passing through the outlet, may persist in surface portions of the charges obtained and subsequently cause de- defects at the surfaces of the articles of glassware into which such charges have been formed.

An object of the present invention is to obviate harmful effects of refractory-contaminated glass in charges obtained from glass issuing from a submerged outlet of a glass feeding container and in the article of glassware subsequently produced from such charges.

A further object of the invention is to provide reliable and efficient means for and a novel method of preventing refractory-contaminated glass from entering the outlet while it is in condition to impair the quality of the glass passing through said outlet.

A further object of the invention is the provision of efficient means for and a novel method of controlling flow of glass from a glass feeding container, such as the delivery or outer end portion of a forehearth or furnace extension, through the submerged outlet of such a container so as to prevent refractory-contaminated glass from passing in contact with the bottom wall of the container directly into the outlet and to divert the refractory-contaminated glass from the bottom of the container adjacent to the outlet upwardly into hotter and more fluid glass at a higher level and for thorough mixing and homogenizing the glass at that level, including such portions of refractory-contaminated glass as have been diverted thereto, before such glass is permitted to enter the discharge outlet.

A further object of the invention is to control flow of glass in a glass feeding container to a submerged outlet of that container so that the glass permitted to issue downwardly through the outlet will be taken entirely from a level that is located at a substantial distance above the bottom of the feeding container and will not be permitted to pass directly into the outlet from any place at which such glass is in contact with refractory walls of the feeding container.

A still further object of the invention is the provision of a novel means for causing mixing and circulatory movement of glass around and adjacent to the upper end of a submerged outlet of a glass feeding container so as to promote homogeneity and uniformity of temperature and condition of all portions of glass passing to and through the outlet.

Other objects and advantages of the invention will hereinafter be pointed out or will become apparent from the following description of a practical embodiment of the invention, as shown in the accompanying drawing, in which:

Figure 1 is a fragmentary vertical sectional view showing the invention applied to a glass feeding container having a submerged glass feeding outlet;

Fig. 2 is a plan view of a fragmentary portion of the bottom of the glass feeding container, showing a preferred formation at the upper end of the outlet, the view being taken from a plane indicated by the section line 2—2 of Fig. 1;

Fig. 3 is a side elevation of the lower end portion of a novel rotary tubular member, shown in Fig. 1, for effecting mixing and circulatory movement of glass adjacent to the outlet and for cooperating with the outlet structure to prevent refractory-contaminated glass from passing directly along the bottom of the feeding container into the outlet;

Fig. 4 is a section through the tubular member shown in Figs. 1 and 3, the view being taken substantially on line 4—4 of Fig. 3; and Fig. 5 is a bottom plan view of the tubular member shown in Figs. 1, 3 and 4.

Referring now to the drawing, and particularly to Fig. 1, the numeral 1 designates a glass feeding container which, in the form shown, constitutes a refractory bowl at the outer end of the flow channel of a forehearth, a portion of which is indicated at 2. This forehearth is adapted for connection with a glass melting tank furnace (not shown), or glass may be supplied thereto in any suitable known manner so that a supply body in the container 1 will submerge a discharge outlet 3 in the bottom of that container. Glass of the supply body may fill the container 1 to any suitable level, such for example as that indicated by the dot and dash line 4.

The outlet 3 may comprise a vertical passage through a relatively thick portion of the bottom wall of the container 1, supplemented by an orifice ring 3a. Any suitable means may be employed to secure the orifice ring 3a in place. As means for this purpose are well known in the art, no example thereof need be illustrated or further described herein.

Only bare refractory walls of the feeding container 1 and of a portion of the forehearth channel have been shown. It is to be understood, however, that such walls may be suitably insulated and supported in any suitable known manner. Also, any suitable known means may be provided for regulatively controlling the temperature and condition of the glass passing to and in the feeding container 1.

The feeding of glass through the outlet may be under the control of any suitable mechanism such, for example, as mechanism that includes a reciprocating refractory plunger 5. Only a fragmentary portion of such plunger is shown in the drawing as both it and its manner of use in regulably controlling feeding of glass through a submerged discharge outlet of a feeding container are well known in the art. As shown, the lower end portion of the implement 5 depends into the outlet passage in spaced relation with the walls thereof and in axial alignment with the outlet. During its vertical reciprocation, the lower end of this implement may remain constantly in the outlet passage or may depend into it only during a portion of the stroke of the implement.

In carrying out the present invention, with the use of a glass feeding container, such as shown in Fig. 1 and as hereinbefore described, I provide means for controlling flow of glass to the outlet so as to obviate the detrimental effects which heretofore have been produced by the inclusion of refractory-contaminated glass in glass issuing from the outlet. To this end, I may provide a refractory tubular member 6 in position to depend into the glass in the feeding container in substantially axial alignment with the outlet. The tubular member 6 preferably has its bore, at least the bore of the lower end portion thereof, slightly larger than the upper end portion of the outlet passage.

The tubular member 6 is provided with lateral ports 7 through its side walls. These ports are located below the level of the supply body of molten glass in the feeding container but above the lower end of the tubular member. Such ports may be of any suitable number and preferably are regularly spaced about the periphery of the tubular member.

The portion of the tubular member below the ports 7 is enlarged so as to form a head 8 which may be of generally disk-like form. The lower surface of the head 8 preferably has regularly spaced or symmetrically located cut-away portions, indicated at 9, Fig. 5, thus defining on the lower surface of the head a central annular boss 10 having regularly spaced projecting spiral wings or vanes 11.

The outer spirally curved lateral walls 12 of these curved wings or vanes will deflect glass outwardly from the space between the head 8 and the adjacent portion of the bottom wall of the container when the tubular member is rotated about its axis in the direction indicated by the arrows in Figs. 1 and 3 to 5 inclusive. As hereinafter will be pointed out, the upper end of the outlet structure or the bottom of the feeding container surrounding the upper end of the outlet may be formed to cooperate with the head 8 in deflecting glass outwardly from such space.

Any suitable known means may be provided for supporting the tube 6 in substantially axial alignment with the outlet so that the head portion of the tube will be located at a predetermined adjustable distance from the portion of the bottom wall of the feeding container surrounding the outlet of the feeding container and for rotating the tubular member at a predetermined desirable speed about its axis. As suitable mechanisms for supporting and operating the tubular member 6 are well known in the art to which the present invention appertains, it is believed unnecessary to illustrate an example of such a mechanism in the drawing or to further describe the same herein.

The head 8 is provided at its upper surface adjacent to its peripheral edge with spaced arcuate upstanding walls 13. The walls 13 have inclined upper surfaces which are merged at their lower ends into the upper surface of the main portion of the head 8, as clearly shown in Figs. 1, 3 and 4. The higher end portions of the walls 13 are located directly above the outer ends of the spiral wings or vanes 11 on the bottom of the head 8 and the walls 13 preferably correspond in number and in angular spacing with the wings or vanes 11.

Arcuate passages, as indicated at 14, are provided between the walls 13 and the portion of the tube 6 in which the ports 7 are located. The ports 7 may have their upper ends located above the level of the highest portions of the walls 13 while the lower ends of the ports 7 may be located slightly above the bottoms of the passages 14, or in other words slightly above the plane of the upper surface of the main portion of the disk-like head 8. Entrances to the passages 14 are provided between the spaced ends of the respective walls 13, as at 15, Fig. 4, and glass also may enter such passages over the inclined upper surfaces of the walls 13. Functions of the walls 13 will be pointed out in the description of the operation of the complete device.

The bottom wall of the feeding container may be enlarged vertically immediately around the outlet so as to provide an annular curb or baffle 16, best seen in Figs. 1 and 2. The annular curb or baffle preferably has an outer diameter approximating that of the head 8 of the tube 6.

The curb or baffle 16 may have regularly spaced cut away portions indicated at 17, Figs. 1 and 2, at its top, thus providing around the outlet a central annular boss 18 having regularly spaced projecting spiral or curved wings or vanes 19. The cut away portions 17 and the spiral wings or vanes 19 are generally similar to the cut away portions 9 and the wings or vanes 11 at the bottom of the head 8 of the tubular member 6. However, as a comparison of Figs. 2 and 4 clearly shows, the curved ends of the wings or vanes 19 are turned in the direction opposite to that in which the curved ends of the vanes 11 are turned. Consequently, when the tube 6 is rotated in the direction indicated by the arrows in the drawing, or in other words in a counterclockwise direction, the spirally curved lateral surfaces 12 of the vanes 11 will cooperate with spirally curved lateral surfaces 20 of the vanes 19 of the stationary outlet structure to produce an effective outward impelling action on the glass between the head 8 of the rotating tubular member and the underlying curb structure at the upper end of the outlet.

From the foregoing description of the various parts of the device, the operation thereof may be readily understood. Refractory-contaminated glass passing along the bottom wall of the feeding container toward the outlet, as indicated by the arrows $a$ in Fig. 1, will arrive at the outer edge of the upward enlargement or curb structure 16 at the upper end of the outlet. The coaction of the hereinbefore particularly described adjacent vanes, impelling surfaces and deflecting walls at the upper end of the outlet and at the bottom of the head 8 of the rotating tube, respectively, will cause outward movement of glass between the head 8 and the underlying curb 16, substantially as indicated by the arrows $b$, Fig. 1. Such outwardly moving glass will be renewed continuously by glass that has entered the ports 7 of the tubular member 6 and has passed downwardly along the inner wall of the head 8 to the edge of the outlet, as indicated by the arrows $c$, Fig. 1. The refractory-contaminated glass that has reached the outer edge of the curb 16 tends to pass inwardly between such curb and the head 8 but such movement is prevented by the outwardly moving glass between these parts. The inward movement of glass from a higher level through the ports 7 to the interior of the tube 6 and downwardly through the outlet, substantially as indicated by the arrows $d$, Fig. 1, will cause a general upward movement of glass around the head 8. Such upward movement may be aided by the impelling action of the inclined upper surfaces of the walls 13 on the head 8. The refractory-contaminated glass will tend to cling to the adjacent refractory surfaces but will be broken up and carried outwardly and upwardly by the outwardly and upwardly moving currents of glass at the periphery of the head 8. The walls 13 on the head 8 will also serve as moving guards or baffles which will prevent entrance of previously contaminated glass to the passages 14 and ports 7 until the broken up portions or strings of such glass have been thoroughly mixed and blended with hotter uncontaminated glass at a level substantially above the bottom of the feeding container. As the amount of refractory-contaminated glass is small as compared with the body of glass with which it is mixed, the mixed glass, at the time it is permitted to enter the ports 7 and pass downwardly through the bore of the tube 6 into the outlet, will be sufficiently homogeneous and uniform in temperature for satisfactory glass feeding operations. In other words, the refractory contaminated glass will have been sufficiently reconditioned and assimilated by the main body of glass to obviate detrimental effects therefrom in glassware made from charges obtained from glass fed through a submerged outlet of a feeding container equipped with structure embodying the present invention.

While a particular structural embodiment of the invention has been illustrated in the accompanying drawing and described in detail herein, it is to be understood that the invention is not limited to such details as many of them can be omitted or changed and various other combinations of structural parts may be provided without departing from the spirit and scope of the invention. The invention contemplates the provision of any suitable means for and the method of causing an outward movement of glass at the upper edge of the submerged outlet of a glass feeding container and inflow to the outlet of glass that has been taken from the supply body at a level higher than that at which such outward movement of glass takes place. The invention is not to be limited beyond the terms of the appended claims.

I claim:

1. In combination, a glass feeding container having an outlet submerged by a supply body of glass, and a rotating tubular member depending into the glass in the container in substantially axial alignment with the outlet, said tubular member having an enlarged head portion at its lower end and having a lateral port above said head portion for the inflow of glass from the supply body to the interior of said tubular member, said head having spiral vanes on its bottom surface spaced angularly around the bore of the tubular member and adapted as said tubular member rotates to impel glass outwardly between said head and the portion of the bottom of the container immediately surrounding the top of said outlet.

2. In combination, a glass feeding container having an outlet submerged by a supply body of glass, and a rotating tubular member depending into the glass in the container in substantially axial alignment with the outlet, said tubular member having an enlarged head portion at its lower end and having a lateral port above said head portion for the inflow of glass from the supply body to the interior of said tubular member, said head having spiral vanes on its bottom surface spaced angularly around the bore of the tubular member and adapted as said tubular member rotates to impel glass outwardly between said head and the portion of the bottom of the container immediately surrounding the top of said outlet, said head also having angularly spaced raised walls on its upper surface at its peripheral edge for diverting the outwardly impelled glass upwardly a considerable distance into the supply body of molten glass in the container.

3. In combination, a glass feeding container having an outlet submerged by a supply body of glass, and a rotating tubular member depending into the glass in the container in substantially axial alignment with the outlet, said tubular member having an enlarged head portion at its lower end and having a lateral port above said head portion for the inflow of glass from the supply body to the interior of said tubular member, said head having spiral vanes on its bottom surface spaced angularly around the bore of the tubular member and adapted as said tubular member rotates to impel glass outwardly between said head and the portion of the bottom of the container immediately surrounding the upper end portion of said outlet, said head also having angularly spaced raised walls on its upper surface at its peripheral edge for diverting the outwardly impelled glass upwardly a considerable distance into the supply body of molten glass, said raised portions on the upper surface of said head having inclined top surfaces to cause upward currents of glass in the supply body as said tubular member rotates.

4. The combination with a glass feeding container having an outlet submerged by a supply body of glass in the container, of a rotating tubular member depending in the glass in the container in substantially axial alignment with the outlet, said tubular member having an enlarged head portion at its lower end, the lower surface of said head portion being spaced from the bottom of the container and adapted as said tubular member rotates to impel glass outwardly between said head portion and the portion of the bottom of the container immediately surrounding the upper end of said outlet, said head having on its upper surface angularly spaced projections at its peripheral edge, said projections having upper surfaces formed to cause upward currents of glass at the periphery of said head as said tubular member rotates, said tubular member having a lateral port located above said head to cause inflow of glass from the supply body in the container to the interior of said tubular member.

5. In combination, a glass feeding container having an outlet submerged by a supply body of glass, and a rotating tubular member depending in the glass in the container in substantially axial alignment with the outlet for controlling flow through the outlet, said tubular member having a radially enlarged head portion at its lower end and having a lateral port located above said head portion for the inflow of glass from the supply body to the interior of said tubular member, said tubular member having a bore of greater diameter at the lower end of said head portion than the diameter of the upper end portion of said outlet and having its lower end surface formed to cooperate with the adjacent bottom surface of the container to effect substantial outward flow of glass from between said surfaces back into the glass of the supply body.

6. In combination, a glass feeding container having an outlet submerged by a supply body of glass, a rotating tubular member depending in the glass in the container in substantially axial alignment with the outlet for controlling flow to the outlet, said tubular member having a radially enlarged head portion at its lower end and having a lateral port located above said head portion for the inflow of glass from the supply body to the interior of said tubular member, said tubular member having a bore of greater diameter at the lower end of said head portion than the diameter of the upper end portion of said outlet and having its lower end surface formed to cooperate with the adjacent bottom surface of the container to effect substantial outward flow of glass from between said surfaces back into the glass of the supply body, and a vertically reciprocable plunger depending through said tubular member in spaced relation with the walls thereof and in substantially axial alignment with said outlet for controlling flow of glass through said outlet.

7. The combination with a glass feeding container having an outlet submerged by a supply body of glass in the container, of a rotating tubular member depending in the glass in the container in substantially axial alignment with said outlet, said tubular member having angularly spaced depending projections on its lower end surface, said container having its bottom wall formed with a raised portion immediately surrounding said outlet and directly beneath said tubular member, said raised bottom portion of the container having raised projections spaced angularly around said outlet for cooperating with the depending projections at the lower end of said rotating tubular member to impel the glass between the lower end of said tubular member and the adjacent portion of the bottom of the container horizontally outward, said tubular member having a lateral port located at a substantial distance above the lower end of the tubular member for the inflow of glass from the supply body of the container to the interior of said tubular member.

8. In combination, a glass feeding container having an outlet submerged by a supply body of glass, the bottom wall of said container having an annular raised portion surrounding the upper end portion of said outlet, said raised portion having at its upper surface angularly spaced spiral projections, a rotating tubular member depending in the glass in the container in substantially axial alignment with the outlet, said tubular member having its lower end portion formed with depending angularly spaced spiral projections turned oppositely to the spiral projections on the bottom portion of the container, said spiral projections at the lower end of said tubular member and on the bottom of the container being adapted to cooperate as said tubular member rotates to impel the glass horizontally outward in the space between the lower end of the tubular member and the adjacent portion of the bottom wall of the container, said tubular member having a lateral port located at a substantial distance above the lower end of the tubular member for the inflow of glass from said supply body to the interior of said tubular member.

9. In combination, a refractory glass feeding container having an outlet at its bottom submerged by a supply body of glass, means for controlling flow of glass to the container outlet to prevent refractory-contaminated glass from passing along the bottom of the container into said outlet, said means being of such character as to impel refractory-contaminated glass outwardly at the rim of the outlet, then upwardly into the main body of glass for mixing with uncontaminated glass of the supply body and for preventing entrance of glass to the outlet except from a level substantially above that at which refractory-contaminated glass at the outlet is impelled outwardly.

10. In combination, a refractory glass feeding container having an outlet in its bottom submerged by a supply body of glass, means adjacent to the outlet for preventing ingress of refractory-contaminated glass to the outlet, said means causing localized outward movement of glass at the rim of the outlet, then upward movement of the outwardly moved glass into the main body of glass in the container, thorough mixing of the upwardly moved glass with other glass of the supply body, and downward movement of glass into the outlet only from a plane substantially above that at which said upward movement of outwardly moved glass is effected.

11. The method of obviating defects in glassware produced from charges obtained from glass fed through a submerged outlet of a refractory glass feeding container, comprising the steps of causing the portion of a bottom layer of glass adjacent to the outlet to be moved horizontally outward and then upward into hotter glass of the supply body in the container, and delivering to the outlet only glass of the supply body from a level substantially above that of said outwardly moving portion of said bottom layer of glass.

12. The method of controlling flow of glass from an outlet in the bottom of a refractory glass feeding container, which comprises the steps of providing a supply body of glass in the container in such manner as to cause glass of the supply body to tend to issue from the outlet by gravity, causing glass that has approached the outlet along the bottom of the container to move horizontally outward at the rim of the outlet and thence upwardly into the main body of glass in the container, and restricting flow of glass into the outlet to glass taken from the supply body at a level substantially above the bottom of the feeding container.

13. The method of controlling flow of glass from an outlet in the bottom of a refractory glass feeding container, which comprises the steps of providing a supply body of glass in the container in such manner as to cause glass of the supply body to tend to issue from the outlet by gravity, causing glass that has approached the outlet along the bottom of the container to move horizontally outward at the rim of the outlet and thence upwardly into the main body of glass in the container, restricting flow of glass into the outlet to glass taken from the supply body at a level substantially above the bottom of the feeding container, and causing a circulatory movement of glass of the supply body about an axis substantialy in line with the center of the outlet.

JAMES BAILEY.